Dec. 8, 1959 E. M. BOGAR, JR 2,916,234
MIRROR SUPPORT
Filed April 5, 1956 2 Sheets-Sheet 1
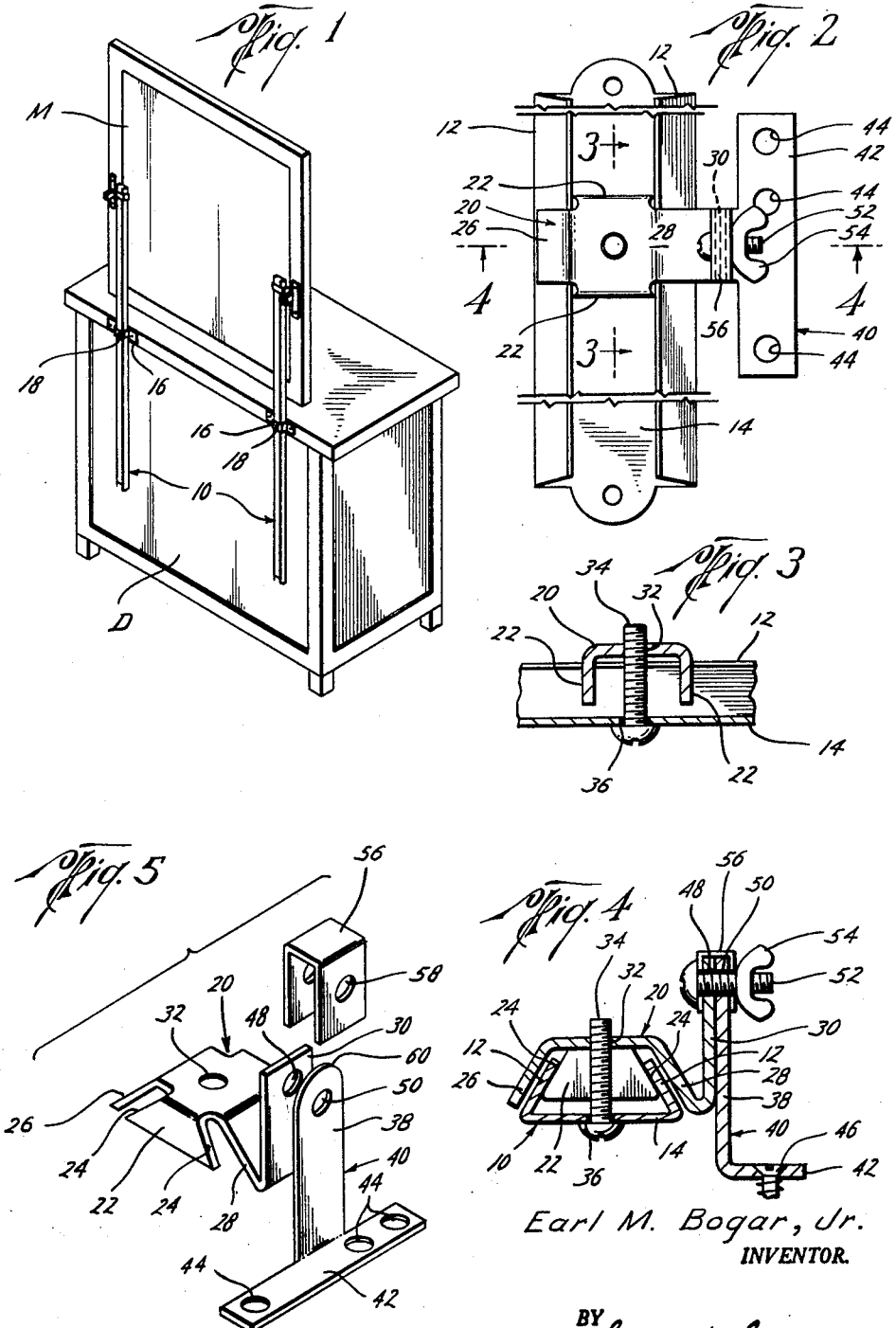
Earl M. Bogar, Jr.
INVENTOR.
BY Charles E. Lightfoot
ATTORNEY

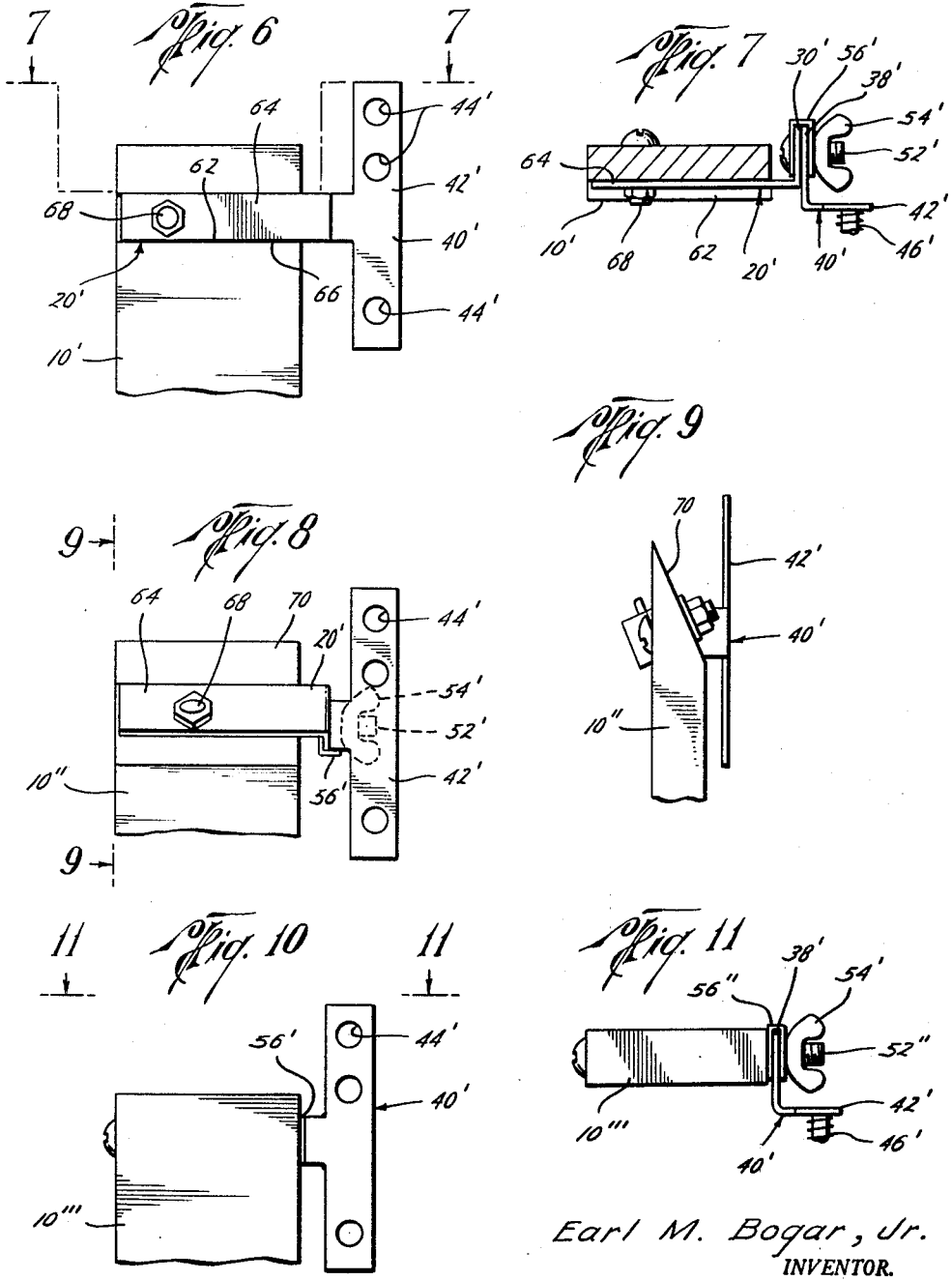

United States Patent Office 2,916,234
Patented Dec. 8, 1959

2,916,234

MIRROR SUPPORT

Earl M. Bogar, Jr., Houston, Tex.

Application April 5, 1956, Serial No. 576,369

2 Claims. (Cl. 248—28)

This invention relates to a mirror support and more particularly to a device for connecting a mirror to a dresser, bureau, or other article of furniture to support the mirror in an upright position thereon.

As commonly constructed, articles of furniture, such as vanities, dressers, bureaus and the like are provided with mirrors which are usually disposed along the rear edge of the furniture and extending upwardly therefrom in an upright position. The mirrors are often attached to the furniture by means of uprights secured to the back of the furniture and extending upwardly along the back of the mirror and secured thereto, as by means of screws.

In shipping articles of furniture of this kind the mirrors are removed and packed separately, both because of the likelihood that they may become broken and for the purpose of conserving space. The removal and replacement of the mirrors thus presents a task requiring considerable skill and the expenditure of much time and labor, thereby becoming a substantial item of expense.

The present invention has for an important object the provision of a mirror support having parts which are easily secured to the mirror and to the article of furniture and which may be easily and quickly assembled to support the mirror in place.

Another object of the invention is to provide a mirror support made in several parts adapted to cooperate to adjustably support a mirror on an article of furniture, and having means for clamping the parts together, without exerting any force on the fastening means by which the parts are secured to the mirror and furniture which would tend to loosen the fastenings.

A further object of the invention is the provision of a mirror support which is constructed for use with mirrors of widely differing sizes and by which the same may be easily and quickly applied to different types of furniture.

The invention also contemplates a mirror supporting structure having parts which are pivotally secured together and in which means is provided for preventing the loosening of the fastening means by repeated tilting movements of the mirror.

Another object of the invention is to provide a mirror support whose parts are of simple design and rugged construction, and which are economical in manufacture.

The above and other important objects and advantages of the invention may best be understood from the following detailed description, constituting a specification of the invention when considered in conjunction with the annexed drawings, wherein—

Figure 1 is a perspective view illustrating a preferred embodiment of the invention applied to a mirror and an article of furniture and showing the manner in which the invention operates to adjustably support a mirror;

Figure 2 is a front elevational view, on an enlarged scale, of the mirror support structure of the invention as illustrated in Figure 1, showing details of construction and the arrangement of the parts;

Figure 3 is a fragmentary cross-sectional view, taken along the line 3—3 of Figure 2, looking in the direction indicated by the arrows;

Figure 4 is a cross-sectional view taken along the line 4—4 of Figure 2, looking in the direction indicated by the arrows;

Figure 5 is a perspective view, on an enlarged scale, of parts of the mirror connecting structure in disassembled condition showing the construction and relationship of the parts;

Figure 6 is a front elevational view of a somewhat different form of the invention;

Figure 7 is a top plan view of the form of the invention illustrated in Figure 6;

Figure 8 is a front elevational view of another form of the invention;

Figure 9 is a side view of the form of the invention illustrated in Figure 8;

Figure 10 is a front elevational view of a still further form of the invention; and, Figure 11 is a top plan view of the form of the invention illustrated in Figure 10.

Referring now to the drawings in greater detail, the invention is illustrated in Figure 1 in its application to the supporting of a mirror M on an article of furniture, such as a dresser, bureau, or the like indicated at D.

The invention, as particularly illustrated in Figures 1 to 4, inclusive, comprises a pair of uprights 10, each of which takes the form of a channel formed of sheet metal, having a bottom wall 14 and side walls 12 which converge in a direction away from the bottom wall. The uprights are attached to the back of the article of furniture D in any convenient manner, as by means of U-shaped brackets 16, having out-turned flanges at the free ends of the arms of the U, which are perforated, and through which screws may be extended to secure the brackets to the article of furniture, the uprights being slidably extended through the brackets for vertical sliding adjustment therein, and suitable means, such as set screws 18 being provided whereby the uprights may be clamped between the brackets and the article of furniture.

Each of the uprights 10 carries near its upper end a support element 20, which takes the form of a sheet metal body, formed with wing-like portions 22, bent at right angles to the main portion of the body in position to be received in the upright between the side walls 12, and having oppositely sloping edges 24 shaped for engagement with the inner faces of the side walls. The support element 20 is also formed with a portion 26, which is bent to overlie the outer face of the other side wall 12 of the upright, and is rebent at its outer end, as indicated at 30. The support element 20 has a central threaded opening 32, through which a screw 34 is threadably extended, which screw also extends through an opening 36 in the bottom wall 14 of the upright, so that with the wings 22 of this support element 20 in position between the side walls 12 of the upright, the edges 24 of these wings 22 will be positioned for engagement with the inside faces of the side walls 12 to hold the element against tilting movement relative to the upright.

Each of the support elements 20 is pivotally connected to an arm 38 of an angle bracket 40, whose other arm 42 is elongated, and provided with suitable openings 44, through which fastening means, such as the screw shown at 46 may be extended to secure the bracket 40 to the back of the mirror M. The rebent portion 30 of the arm 28, and the long arm 38 are each provided with an opening, such as those indicated at 48 and 50, through which a bolt 52 provided with a wing nut 54 may be extended to pivotally secure the bracket 40 to the support element 20.

In order to prevent loosening of the nut 54 on the bolt 52, upon tilting movement of the mirror M, a U-shaped lock washer 56 is provided, whose arms are provided with openings 58, which may be registered with the openings 48 and 50, when the lock washer is positioned over the rebent portion 30 and the arm 38, and through which the bolt 52 may be extended. The free end of the arm 38 is rounded as indicated at 60, in Figure 5, while the free end of the rebent portion 30 is cut off straight, whereby the bottom of the lock washer 56 will engage the end of the rebent portion 30 to prevent rotation of the washer relative to the support element 20, while at the same time permits rotation of the bracket 40 relative to the washer when the mirror is tilted. By this arrangement the mirror may be repeatedly tilted to different positions, without causing wing nut 54 to become loosened so that the mirror will remain tilted in any position to which it is moved, and is prevented from swinging downwardly under the influence of gravity.

In applying the invention to a mirror and article of furniture, the support elements 20 are first inserted between the side walls of uprights, and the screws 34 inserted to secure the support elements to the uprights near the upper ends, the brackets 42 are secured to the frame of the mirror, in the manner indicated in Figure 1, and these brackets are then pivotally connected to the support elements by means of the bolts 52 and wing nuts 54, with the lock washers 56 in position to prevent loosening of the wing nuts. The brackets 16 may then be attached to the article of furniture in the manner illustrated in Figure 1, in positions to permit the uprights to be inserted through these brackets for vertical sliding movement. The mirror M may then be raised to the desired height above the article of furniture, and the set screws rotated to secure the uprights in position to hold the mirror at the desired height.

It will be noted that the arm 38 of the bracket 40 40 may be made of sufficient length to permit the mirror to be tilted in either direction for some distance, without engagement of the mirror with the uprights.

A somewhat different form of the invention is illustrated in Figures 6 and 7, wherein the uprights 10' may be formed of wood, the upper end of each upright having a cut away portion forming an upwardly facing shoulder 62, spaced somewhat below the upper end of the upright. In this form of the invention the support element 20' takes the form of an angle having one arm 64 positioned with its lower edge 66 in engagement with the upwardly facing shoulder 62, and secured to the upright 10' by means of a bolt 68, extended through suitably located perforations in the arm and upright. The support element 20' has another arm 30', which is spaced somewhat beyond a side edge of the upright 10', for engagement with a bracket 40', which is shaped similar to the bracket 40, previously described, and is similarly attached to the frame of the mirror. The arm 30' of the element 20' is pivotally connected to the arm 38' by a bolt 52', extending through perforations in the arms 30' and 38', and provided with a wing nut 54' and the wing nut 54' is prevented from becoming loosened on the bolt by means of a lock washer 56', similar to the lock washer 56, and applied in the same manner.

In this form of the invention the uprights 10' may be attached to the article of furniture in any suitable manner, as by means of screws, not shown, the mirror being supported on the brackets 40' for tilting movement relative to the support elements 20' in the same manner as previously described in connection with the form of the invention illustrated in Figures 1 to 5, inclusive.

Figures 8 and 9 illustrate a further form of the invention, wherein the upright 10" is formed with a beveled face 70 at its upper end against which the arm 64 of the support element 20' is positioned, the construction and arrangement of the parts being otherwise identical to those described in connection with the form of the invention illustrated in Figures 6 and 7.

A still further modification of the invention is illustrated in Figures 10 and 11, wherein the support element 20' is left out, the bracket 40' being directly connected to the upright 10''' by a bolt 52'', which extends through the upright from side to side thereof, and through the perforation in the arm 38' and being provided with the wing nut 54'. A U-shaped lock washer 56'' is provided in this form of the invention, which extends over the free end of the arm 38, and through which the bolt 52'' is extended, to permit rotation of the bracket 40', relative to the upright 10''', without causing the wing nut 54' to become loosened. In other respects the bracket 40' is identical with that previously described, and is secured to the mirror in the same manner.

It will be apparent that the invention, constructed and applied in the manner described above provides a mirror support which is of simple design and rugged construction, and by which a mirror may be supported on an article of furniture for repeated movement without becoming loosened.

The invention has been described herein in connection with certain specific embodiments of the same, but it will be understood that this is intended by way of illustration only, and that numerous changes can be made in the construction and arrangement of the parts, without departing from the spirit of the invention or the scope of the appended claims.

Having thus clearly shown and described the invention, what is claimed as new and desired to secure by Letters Patent is:

1. A support for mounting a mirror above an article of furniture for vertical swinging movement comprising an elongated standard of generally channel shape in cross-section having a bottom wall and side walls which converge away from said bottom wall, means for supporting said standard in an upright position on an article of furniture with the upper end of the standard extending above said article, a support element having vertically spaced portions positioned to be extended between the inner faces of the side walls and horizontally spaced portions positioned to overlie the outer faces of the side walls, means for securing the element to said bottom wall with said portions in position to engage said side walls to hold the element against tilting movement relative to the standard and means forming a pivotal connection between said element and a mirror.

2. A support for mounting a mirror above an article of furniture for vertical swinging movement comprising an elongated standard of generally channel shape in cross-section having a bottom wall and side walls which converge away from said bottom wall, means for supporting said standard in an upright position on an article of furniture with the upper end of the standard extending above said article, a support element having a central portion and vertically spaced, horizontally extending plate-like portions positioned to be extended between said side walls and having edge portions disposed substantially parallel to said side walls and horizontally spaced, vertically extending plate-like portions positioned to overlie the outer faces of said side walls in parallel relation thereto, means for connecting said central portion to said bottom wall with said plate-like portions in position for engagement with said side walls to hold the element against tilting movement relative to said standard, and means forming a pivotal connection between said element and a mirror.

References Cited in the file of this patent
UNITED STATES PATENTS

| | | |
|---|---|---|
| 1,609,396 | Blonigen | Dec. 7, 1926 |
| 1,807,256 | Ryder | May 26, 1931 |
| 1,860,073 | Brewster | May 24, 1932 |
| 2,313,532 | Garrett | Mar. 9, 1943 |
| 2,688,901 | Haugaard | Sept. 14, 1954 |
| 2,694,543 | Norris | Nov. 16, 1954 |